United States Patent
Cho

(10) Patent No.: US 7,121,558 B2
(45) Date of Patent: Oct. 17, 2006

(54) GASKET STRUCTURE FOR FUEL CELL AND FABRICATION METHOD OF THE SAME

(75) Inventor: Kyu Taek Cho, Gwangmyeong-si (KR)

(73) Assignee: Hyundai Motor Company, Seoul (KR)

( * ) Notice: Subject to any disclaimer, the term of this patent is extended or adjusted under 35 U.S.C. 154(b) by 10 days.

(21) Appl. No.: 10/750,664

(22) Filed: Dec. 31, 2003

(65) Prior Publication Data
US 2005/0006856 A1    Jan. 13, 2005

(30) Foreign Application Priority Data
Jun. 20, 2003  (KR)  ............. 10-2003-0039982

(51) Int. Cl.
*C08J 3/00* (2006.01)
*C08F 8/00* (2006.01)
*F16J 15/10* (2006.01)

(52) U.S. Cl. .............. 277/650; 277/654; 429/35; 525/197

(58) Field of Classification Search .......... 429/35, 429/36; 525/197, 198; 277/650, 652, 654
See application file for complete search history.

(56) References Cited

U.S. PATENT DOCUMENTS

| | | | | |
|---|---|---|---|---|
| 4,508,777 A | * | 4/1985 | Yamamoto et al. | 442/415 |
| 4,885,341 A | * | 12/1989 | Aonuma et al. | 525/187 |
| 5,217,797 A | * | 6/1993 | Knox et al. | 428/167 |
| 5,318,837 A | * | 6/1994 | Yoshinaka et al. | 428/328 |
| 5,385,980 A | * | 1/1995 | Schaefer et al. | 525/187 |
| 5,409,993 A | * | 4/1995 | Kojima et al. | 525/104 |
| 5,723,192 A | * | 3/1998 | Jonasz | 428/64.1 |
| 6,030,694 A | * | 2/2000 | Dolan et al. | 428/212 |
| 6,180,685 B1 | * | 1/2001 | Khait | 521/40 |
| 6,207,723 B1 | * | 3/2001 | Matsushita et al. | 521/41 |
| 6,337,120 B1 | * | 1/2002 | Sasaki et al. | 428/66.4 |
| 6,384,145 B1 | * | 5/2002 | Mertzel et al. | 525/232 |
| 6,398,224 B1 | * | 6/2002 | Erb et al. | 277/592 |
| 6,517,085 B1 | * | 2/2003 | Udagawa et al. | 277/592 |
| 6,573,303 B1 | * | 6/2003 | Liu et al. | 521/41 |
| 6,646,052 B1 | * | 11/2003 | Singh et al. | 525/191 |
| 6,814,359 B1 | * | 11/2004 | Senda et al. | 277/639 |
| 6,838,499 B1 | * | 1/2005 | Kimura | 524/268 |
| 6,852,439 B1 | * | 2/2005 | Frank et al. | 429/35 |
| 6,861,171 B1 | * | 3/2005 | Suzuki | 429/34 |
| 2003/0130363 A1 | * | 7/2003 | Meguriya | 521/54 |

FOREIGN PATENT DOCUMENTS

| | | |
|---|---|---|
| JP | 9-507802 | 8/1997 |
| JP | 2000-012054 | 1/2000 |
| KR | 20-0229074 | 4/2001 |
| WO | WO 96/13676 | 9/1996 |

* cited by examiner

*Primary Examiner*—Alison K. Pickard
(74) *Attorney, Agent, or Firm*—Morgan Lewis & Bockius LLP

(57) ABSTRACT

A gasket for fuel cells and a fabrication method of the same have two or more rubber powders having different hardness are coated onto a rigid substrate together with a liquid rubber, for example by a spray method, for thereby implementing a repulsive elastic property of a rubber coated portion and a sealing property. The cell intervals are constantly maintained by using a rigid plate as a spacer. Since a rigid frame provides a consistent distance during stack manufacture and engagement, stack workability and productivity are enhanced.

15 Claims, 4 Drawing Sheets

GASKET STRUCTURE FOR FUEL CELL AND FABRICATION METHOD OF THE SAME

CROSS-REFERENCE TO RELATED APPLICATIONS

This application claims priority of Korean Application No. 10-2003-0039982, filed on Jun. 20, 2003, the disclosure of which is incorporated fully herein by reference.

FIELD OF THE INVENTION

The present invention relates to a gasket structure of a fuel cell, and a fabrication method of the same. More particularly, the invention relates to gasket of a fuel cell formed by applying at least two rubber powders having different hardness to a rigid plate via a spray coating method.

BACKGROUND OF THE INVENTION

Generally, a fuel cell is an apparatus for converting chemical reaction energy between hydrogen extracted from a fuel and oxygen in the air into an electrical energy and generating a clean power. The fuel cell is different from a battery in a point that it is possible to continuously generate power as long as fuel is supplied without recharging the power.

Therefore, the fuel cell has drawn much attention as a power source for next generation engines capable of replacing the current internal combustion engine in all industrial fields with an environment friendly power source.

Among the fuel cells, the PEMFC (Proton Exchange Membrane Fuel Cell) is a fuel cell using a high molecular membrane having a hydrogen ion exchange characteristic as an electrolyte, and has been also called an SPEFC (Solid Polymer Electrolyte Fuel Cell) or PEMFC (Proton Exchange Membrane Fuel Cell). The PEMFC has a lower operation temperature of 80° C. as compared to other types of fuel cells, and has a high efficiency and a large current density and output density, and has a short start time, and a fast response characteristic with respect to a load variation.

In addition, due to the use of high molecular membrane as an electrolyte, it is not necessary to adjust corrosion or electrolyte for the PEMFC and it is also shown not sensitive to variation in pressure of a reaction gas.

In addition, the simplicity in design and easiness in fabrication make it possible to implement various kinds of outputs. Therefore, the PEMFC may be applied to various fields such as a non-polluting power source for an assembling type power generation unit, a portable power unit, and a military power unit. Therefore, the duel cells are extensively researched.

The power generation principle of the PEMFC is described hereunder. When hydrogen gas flows in the direction of cathode, hydrogen gas is decomposed into electrons and hydrogen ions (proton) in a catalyst. When the hydrogen ions are moved through the high molecular electrolyte membrane in the center of the fuel cell, the electrons, oxygen ions and hydrogen ions are combined at an anode for thereby producing water.

The electrons generated at the cathode do not move through the electrolyte membrane but move to the anode through an external circuit. Power and water are produced through the above procedures.

As shown in FIG. 4, as the elements belonging to the PEMFC, there is provided a flow path so that externally provided fuel gases (hydrogen, oxygen) are effectively flown to the electrode. There are further provided a separator 100 for moving generated electrons to an electrical circuit, a gas diffusion media 102 for uniformly diffusing fuel gases to the electrode film 101 and effectively discharging water produced based on an electrical chemical reaction, an electrode (not shown) for carrying a catalyst layer capable of generating an electrical chemical reaction of fuel gas, an electrolyte membrane (not shown) operating as a moving medium and preventing a fuel gas from being crossed over and preventing a short circuit, and a gasket 104 for externally protecting a fuel cell and a fuel gas in the interior of cell and other harmful materials from being discharged to the outside.

Reference numeral 103 represents an engaging bolt, and 105 represents an engaging end plate.

The PEMFC is an apparatus capable of generating power based on an electrical chemical reaction of fuel gas in the unit cell. In particular, entry into the fuel cell by any undesired foreign substance from an external environment is prevented based on a disconnection, e.g., a sealing barrier. In addition, tight sealing is provided to avoid any safety accidents by preventing hydrogen and fuel gases from being discharged to the outside.

The fuel cell gasket 104 is capable of maintaining a constant gap between the separator 100 and the electrode membrane 101, and also plays a role in uniformly distributing a fuel gas flowing into the separator. The reaction generation substance is easily removed. In particular, an electrical contact is maintained between the gas diffusion membrane 102 and the separator 100. The flow of electrons generated by the electrical chemical reaction is effectively enabled.

What is required in the industry is a gasket of the PEMFC wherein the physical property does not deteriorate under a harsh environment condition in the interior of the fuel cell and under an acidic environment condition of PH 1~2. Additionally, as a low molecular weight problem in the material occurs, and as an additive and other ions are eluted, the electrical chemical reaction should be prevented from being interfered. The gasket should be usable in a wide range of temperature condition, namely, −40° C. through 120° C.

In addition, it is advantageous if the gasket is durable, and can uniformly maintain the gap as the time of use is passed for thereby preventing a decrease of performance of a fuel cell.

The gasket of a conventional PEMFC is generally classified into two kinds.

Namely, the PEMFC is classified into a solid gasket and a liquid gasket. In the case of the solid gasket, fluorine and silicon rubbers are compressed and formed and are adhered to the separator. In the case of the liquid gasket, the liquid gasket is coated on the separator or the electrode film and is hardened for thereby being adapted to the fuel cell. The fabrication process is relatively simple compared to the solid gasket. The fabrication cost is decreased, so that it can be widely used.

In the case of the conventional solid gasket, a rubber gasket having a certain thickness is fabricated and disengaged, and then is engaged to the separator of the fuel cell. For example, according to the Japanese patent laid-open No. Hei 9-507802, the solid gasket is fabricated using a combined material that a soft polytetrafluoroethylene layer is combined with a hard fluoropolymer. According to the Korean registered utility model No. 229074, a coupling protrusion is formed on a surface of a sealant for enhancing a coupling force with the sealant into which a porous carbon plate is inserted.

However, in the above method, it is impossible to fabricate an accurate conventional solid rubber gasket having a tolerance of below 0.011 mm using the metallic pattern. For example, when the rubber gasket having a thickness of below 0.5 mm is fabricated, it is impossible to obtain uniform sealing from a gasket commercially manufactured by this process.

In addition, the process for separating the finished gasket from the metallic pattern is difficult. Therefore, it is not easy to fabricate the soft gasket having a hardness shore of less than A 50 (HS). It is impossible to optimize the hardness of the gasket for a fuel cell structure.

Therefore, in the case of the solid gasket, it is so hard that it may cause transformation of a separator. Therefore, it becomes necessary to maintain engaging pressure at a relatively high level thus enlarging the engaging mechanism rather excessively during the stacking process of the fuel cell and also reducing the output density of the fuel cell.

In order to enhance the sealing property, various types of gaskets have been introduced and applied to the contact portions of the gaskets. In this case, the upper and lower gaskets are not accurately arranged, so that a certain torsion may occur. In the case that a few or a few hundreds of fuel cells are stacked, there may be a difference in sealing in each cell, so it is impossible to achieve a desired reliability.

According to the Japanese patent laid-open No. Hei 2000-12054, the liquid gasket is implemented using a liquid material in such a manner that a PTFE micro powder that is mixed with a liquid perfluoro rubber having a viscosity of below $10^5$ poises.

However, in the case of the above liquid gasket, the FIPG (Formed-in-place-gasket) is generally adapted. In this case, the liquid gasket is directly coated to the separator. Therefore, the engaging process is simple. The process is simple, and the productivity is good. However, since the gas diffusion film, electrode film, etc. are stacked in a state that the liquid gasket is not hardened after it is directly coated on the separator, extreme cautions are required during the stacking process. It is difficult to maintain uniform intervals among cells. Since the hardening process is performed by the unit cell, the performance of the ion switch film may be decreased during a hardening process of high temperature.

SUMMARY OF THE INVENTION

Embodiments of the present invention provide a gasket adapted for use in a fuel cell and a fabrication method of the same.

In one embodiment, at least two rubber powders each having different hardness are applied to a rigid plate together with a liquid rubber based on a spray coating method for thereby implementing a sealing property based on a repulsive elastic property of the portion of rubber. More than two rubber powders, each having a different hardness, can be used. With such a gasket is possible to maintain a uniform cell interval by adapting a rigid plate as a spacer. That is, when engaging a stack, it is adapted in a type of rigid frame for thereby enhancing a workability and productivity.

In a preferred embodiment of the present invention, a method for fabricating a gasket for fuel cells comprises the steps of: providing two kinds of rubbers having different hardness into a first and a second rubber powders, for example by grinding two different rubber materials, beneficially each having a certain size; mixing the ground rubber powders with a liquid rubber; providing a rigid plate having a predetermined thickness; spraying the liquid rubber composition onto a surface of a rigid plate moved through a container based on a spray method until the rigid plate/rubber device has certain thickness; vulcanizing the rigid plate in which the rubber powder is coated; and cutting the rigid plate in which the rubber powder is vulcanized.

Beneficially one powder has a higher hardness than the other, and the powder formed of the rubber with the higher hardness (HS) beneficially can have a smaller diameter than the powder formed from the rubber with the lower hardness (HS). The first rubber powder beneficially is formed of a material having a hardness of Shore A 25~50 (HS), and has a diameter of 0.15~0.3 mm. The second rubber powder is formed of a material having a hardness of Shore A 60~80 (HS), and the powder has a diameter of 0.1~0.15 mm.

The rigid plate is advantageously formed of a fabric group having fiber with a glass transition temperature (Tg) of 120° C.~150° C., and a melting temperature (Tm) of 200° C.~250° C., or a plastic film, or a metal plate, where said fabric group, plastic film, or metal plate has a thickness of 0.2~0.3 mm.

The first rubber powder and said second rubber powder are mixed at a volume ratio of 6~7:4~3, respectively.

The liquid rubber beneficially has a viscosity of 1,000,000~3,000,000 cp and is coated on the rigid plate in order for the rubber-coated rigid plate to have a thickness of 0.05~0.1 mm.

In one embodiment the second rubber powder is a plastic powder having a hardness of Shore D 30~60 (HS). Of course, other combinations of rubber and plastic, or rubber and rubber, powders can be used.

In another preferred embodiment of the present invention, the gasket for fuel cells comprises a mixture that is formed of a first rubber powder and a second rubber powder having different hardness and diameters, and a liquid rubber, and is coated on a surface of the rigid plate, and the coated surface is vulcanized.

BRIEF DESCRIPTION OF THE DRAWINGS

The aforementioned aspects and other features of the present invention will be explained in the following description, taken in conjunction with the accompanying drawings, wherein.

DETAILED DESCRIPTION OF PREFERRED EMBODIMENTS

Hereinafter, such embodiments of the present invention are described in detail with reference to the accompanying drawings.

Figure 1:
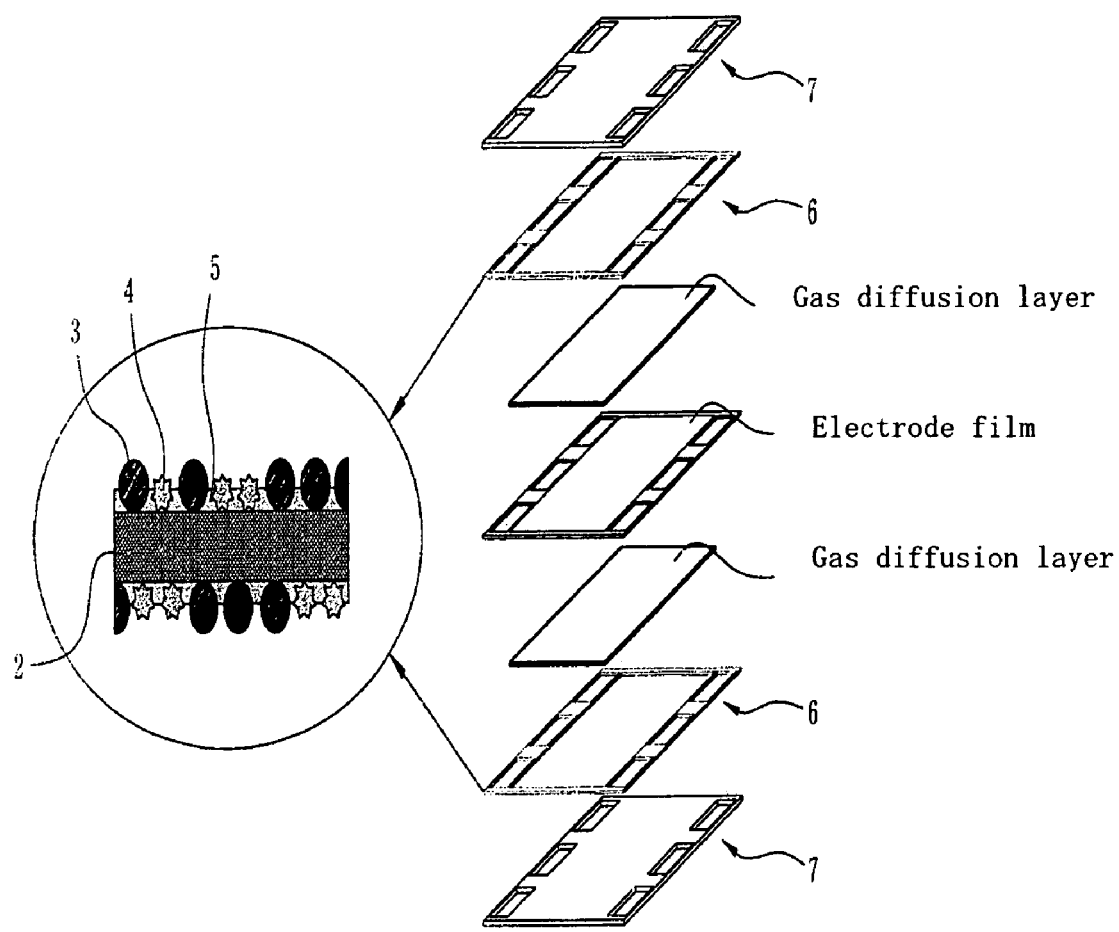
FIG. 1 is a view illustrating a gasket structure of a fuel cell according to the present invention.

FIG. 1 is a view illustrating the construction of a gasket for a fuel cell according to the present invention.

As shown in FIG. 1, the gasket for the fuel cell according to the present invention is directed to a combined type gasket 6 in which a rubber is adapted to a rigid plate 2. At least more than two rubber powders 3 and 4 having different hardness are sprayed to a rigid plate 2 together with a liquid rubber 5 based on a spray method and are hardened for thereby being adapted to the fuel cell. While the gasket shown is has a metal plate covered on both sides by a rubber composition, embodiments are envisioned wherein one or both sides of a metal plate are coated to form a composite gasket.

Namely, the rigid plate 2 operates as a spacer capable of maintaining a certain cell interval, so that the interval between cells in the fuel cell stack is uniformly maintained, thereby decreasing a performance deviation per each cell. A uniform interval is maintained even when the fuel cell is used for a long time, so that the life span of the fuel cell is enhanced. Adapting various materials of rubber powders minimizes the engaging force. The sealing property is maximized. Namely, the sealing property is optimized compared to the engaging force.

In the case of the conventional gasket, the gasket may be too softened and may be sunken down, so that the workability is not good. Since the shape of the gasket is not well maintained, a large amount of adhesive is coated on the gasket and is adhered to the separator 7 for thereby maintaining a certain shape.

Therefore, in the conventional gasket, it takes a long work time to install the gasket. The adhesive that an over amount of the same is adapted may cause a non-electrical chemical reaction, so that the performance may be decreased.

In the present invention, the rigid plate 2 of the gasket 6 maintains a shape of the gasket 6, so that an adhesive is not needed during the stack engagement, thus overcoming the problems encountered in the conventional art.

The rigid plate 2 and the rubber powders 3 and 4 coated by the spray method will be described in detail.

The rigid plate may comprise polymeric fibers, a polymeric plate, or a metal plate. In one embodiment the rigid plate 2 is polymeric and has a glass transition temperature (Tg) of 120° C.~150° C. A fabric group formed of fiber of a melting temperature Tm of 200° C.~250° C., or plastic or metal plate may be used. The thickness of the rigid plate 2 is preferably 0.2~0.3 mm.

At this time, in the case that the thickness of the rigid plate 2 is less than 0.2 mm, it is impossible to perform its inherent function. Namely, a sufficient rigid property is not maintained. In the case that the thickness of the rigid plate 2 exceeds 0.3 mm, since the amount of the rubber powders 3 and 4 coated on the rigid plate 2 is decreased, it is impossible to implement an optimum sealing property. In addition, the plate thickness is needed to stack the fuel cells by higher loads.

Advantageously, the rubber powders 3 and 4 are sprayed to an outer portions of the rigid plate 2 based on the spray method in order to provide a desired sealing property to the gasket 6. At this time, the rubber powders 3 and 4 are strongly adhered to the rigid plate 2, so that the rubber powders 3 and 4 are not separated during the stack engagement. In the present invention, the liquid rubber 5 having the same material as the rubber powders 3 and 4 is adapted for thereby further enhancing the adhesive property.

In addition, advantageously the sprayed on rubber has a substantially uniform thickness and composition. In the case that the liquid rubber is not uniformly discharged during the spray process, there may be differences in the discharging amount and component depending on the position of spray, so that it is impossible to implement a uniform performance.

Namely, the discharging performance is determined based on the viscosity of the liquid rubber 5. In the present invention, the liquid rubber 5 having a viscosity of below 1 million through 3 million cp (centipoises) is adapted. For example, the viscosity can be between about 1 million cp to about 3 million cp.

In the case that the viscosity of the liquid rubber 5 is lower than 1 million cp, the injection and discharging properties are good but physical property is bad. In the case that the viscosity of the liquid rubber 5 is higher than 3 million cp, the physical property is good but the injection and discharging properties are bad.

The liquid rubber 5 is vulcanized and has a cured hardness of Shore A 45~50 (HS) for thereby maintaining a desired elastic force. Unless otherwise stated, hardness is given in Shore A.

At this time, in the case that the hardness is smaller than Shore A 45 (HS) after the liquid rubber 5 is vulcanized, it is impossible to maintain an inherent shape of the rubber powders 3 and 4. In the case that the hardness is bigger than Shore A 50 (HS), the liquid rubber is too hard for thereby requiring a larger engaging force, so that the separator 7 may get bent. The engaging mechanism may gain weight, so that the stack weight and current per volume, namely, the current density may be decreased.

The height of coating of the liquid rubber 5 is preferably 0.05~0.1 mm.

Namely, in the case that the height of the coating of the liquid rubber 5 is smaller than 0.05 mm, the rubber powders 3 and 4 may be escaped to the outside, and in the case that the height of coating of the liquid rubber 5 is larger than 0.1 mm, the sealing property is more largely affected by the liquid rubber 5 rather than the sealing is adjusted by the rubber powders 3 and 4, so that it is impossible to implement an optimized desired sealing property of the present invention with respect to the engagement force.

The following table 1 illustrates the physical properties of the liquid rubber 5 adapted in the present invention.

TABLE 1

| Item | Unit | Liquid rubber | Remarks |
| --- | --- | --- | --- |
| Viscosity | Cp | 1million~3million | |
| Hardness | Shore A (HS) | 45~50 | |
| Tensile strength | Mpa | 3~5.2 | |
| Elongation | % | 110~170 | |
| Transmittance of $H_2$ gas | Mol m/m$^2$ sPa | Below 9 × 10~15 | |
| Transmittance of moisture | G/m$^2$/24 hr | 0.1~0.32 | 40° C. |
| 20% compression set | % | 15~25 | 120° C. × 100 hr |

In the present invention, the composition may contain a soft first rubber powder 3 that is used for decreasing the engaging pressure during the stack engagement. The first rubber powder 3 is capable of increasing the displacement when the first rubber powder 3 is compressed to a certain shape, and the displacement is uniformly spread into the entire portions between the gasket 6 and the separator 7 for thereby enhancing a sealing property. In particular, the first rubber powder 3 may be well adapted based on the roughness of the surface of the separator 7. The requirements with respect to the flatness of the separator 7 may be decreased due to the sealing property of the soft rubber.

However, in the case that the first rubber powder 3 is too soft, the repulsive elastic property with respect to the separator 7 is decreased, so that a leakage may occur between the separator 7 and the gasket 6. In the present invention, a hard second rubber powder 4 is used together with the soft first rubber powder 3 for thereby effectively adjusting the repulsive elastic property needed for the gasket 6.

Namely, in the present invention, the repulsive elastic property with respect to the separator 7 is adjusted using the hard second rubber powder 4, and a fine gap between the separator 7 and the gasket 6 is adjusted using a displacement and spreading property of the soft first rubber powder 3.

The soft first rubber powder 3 has a low hardness material of Shore A 25~50 (HS) and has a diameter of 0.15~0.3 mm for thereby implementing a large displacement during the compression of the stack.

In particular, the first rubber powder is formed of an elastomer having a glass transition temperature of below a room temperature.

The second rubber powder 4 is formed of an elastomer of Shore A 60~80 (HS) or a plastic material of Shore D 30~60 (HS), or mixture thereof, and the diameter of the second rubber powder 4 is preferably 0.1~0.15 mm.

Therefore, the first rubber powder 3 of a large size and soft material is first transformed during the stack compression and is spread onto the gasket 6 in a film shape. When the rubber powder is compressed by a certain degree, the hard second rubber powder 4 has a certain elastic property above a certain degree with respect to the compressed separator 7, resulting in an excellent sealing property.

In particular, the volume ratios of the first rubber powder 3 and the second rubber powder 4 are 6~7:4~3 for thereby implementing an optimum sealing property.

In addition, in the above descriptions, the rubber powders 3 and 4 formed of two materials are described in the present invention, but at least more than two materials may be adapted in the powder state the present invention.

As a method for obtaining the rubber powders 3 and 4 adapted in the present invention, the waste rubbers and other non-metallic materials may be ground and used, so that it is possible to significantly decrease the fabrication cost of the products.

Figure 2:
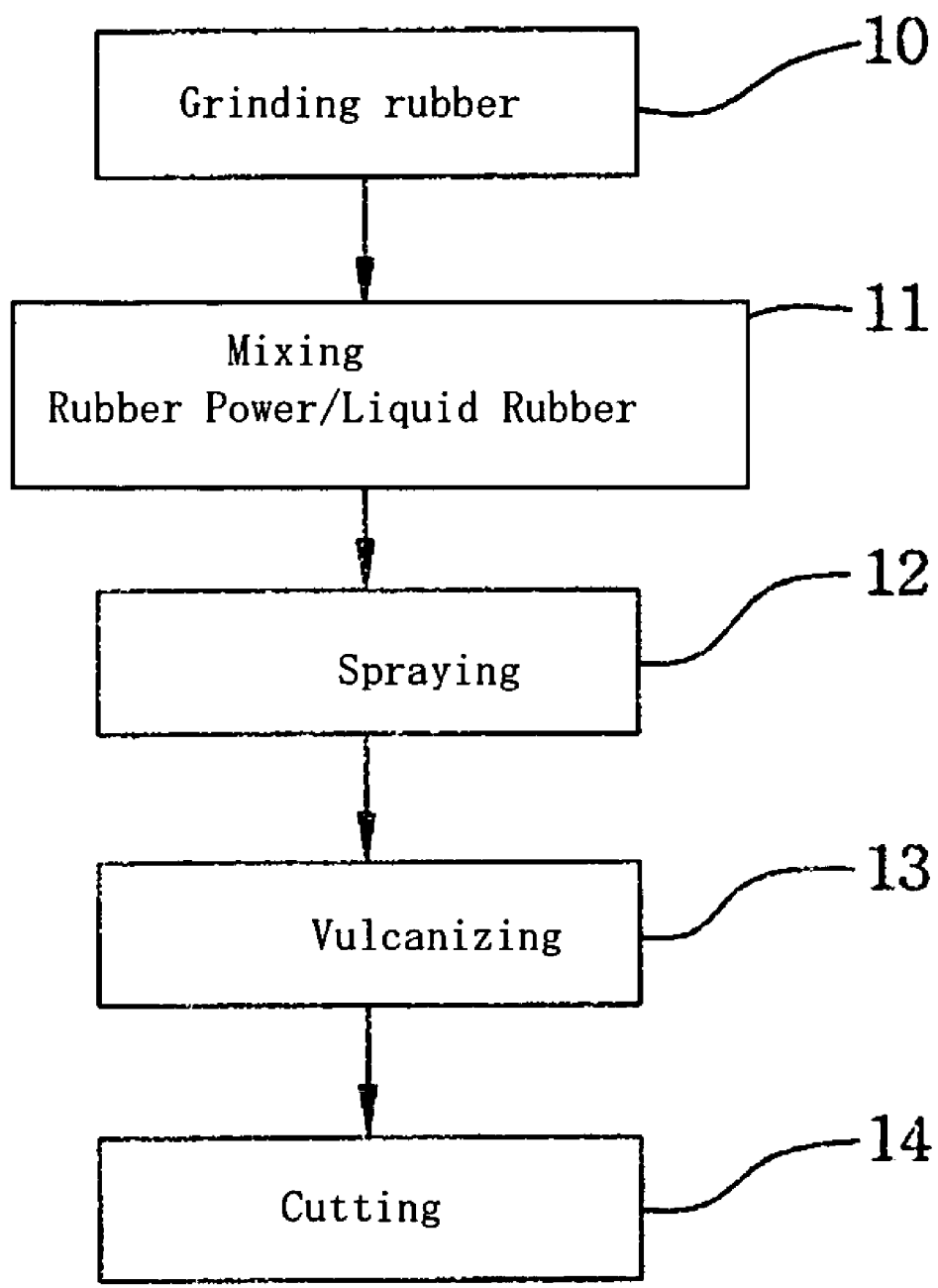
FIG. 2 is a block diagram illustrating a fabrication method of a gasket structure of a fuel cell according to the present invention.

As shown in FIG. 2, the method for fabricating a gasket for a fuel cell according to the present invention includes the steps of grinding rubber having a certain hardness into rubber powders 3 and 4 each having a certain size, mixing the rubber powders 3 and 4 with a liquid rubber 5, spraying the rubber powders 3 and 4 onto the rigid plate 2 moved through the container based on the spray method, vulcanizing the rubber powders 3 and 4 sprayed by the rigid plate 2 in an oven 23, and cutting the rigid plate 2 in which the rubber powders 3 and 4 are vulcanized, into the gaskets 6 of certain sizes.

Figure 3:
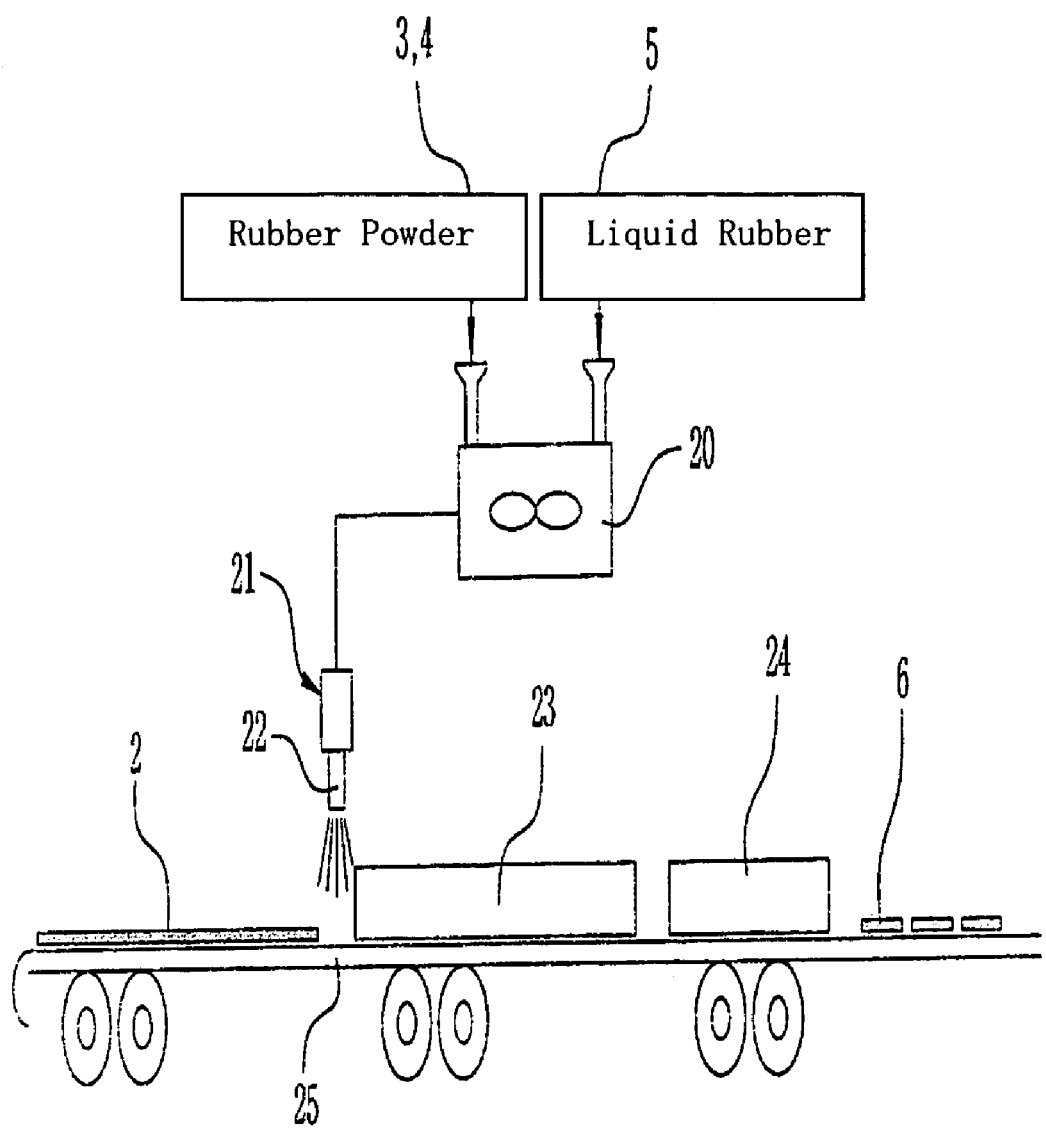
FIG. 3 is a view illustrating a fabrication process of a gasket structure of a fuel cell according to the present invention.
Figure 4:
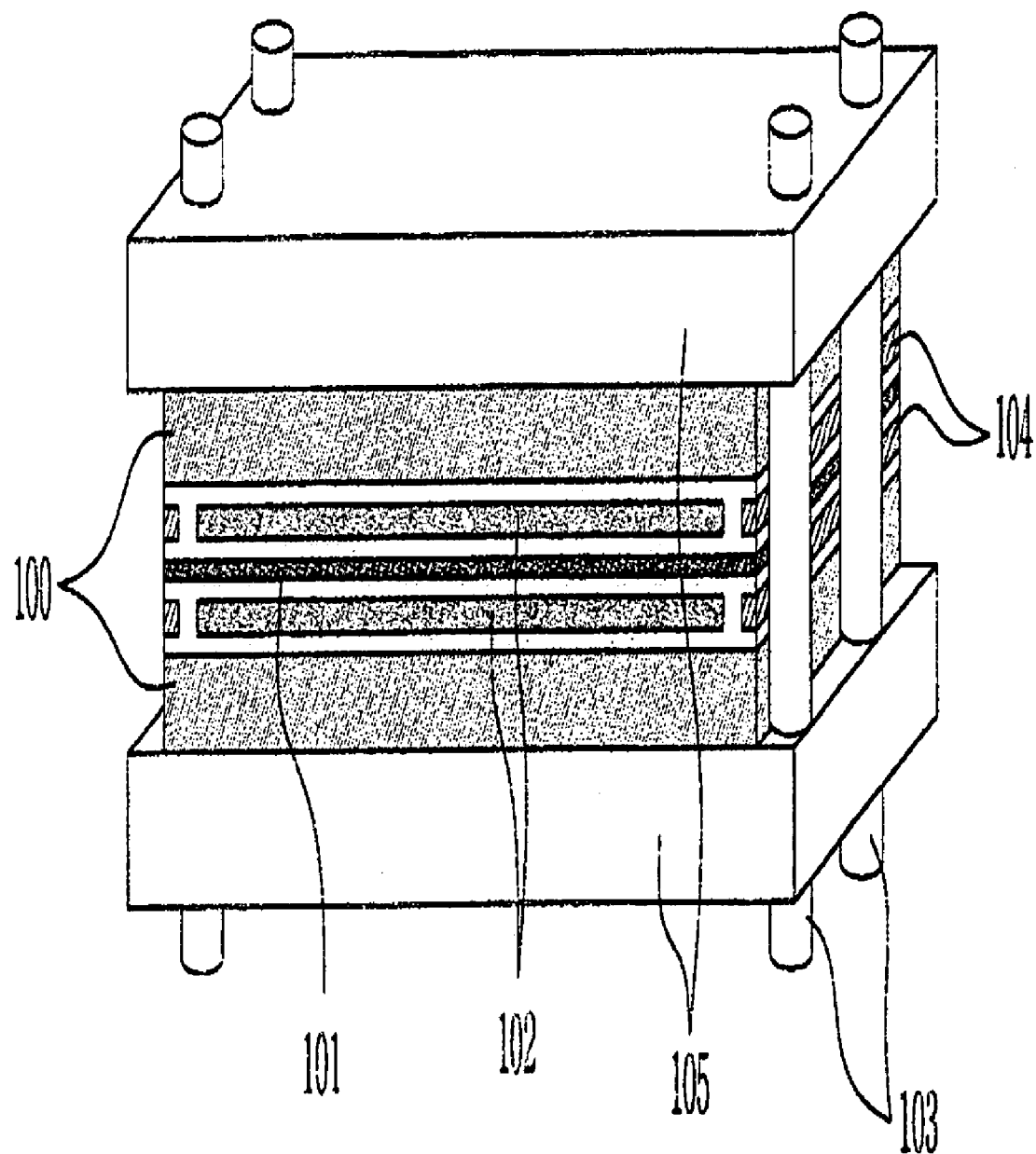
FIG. 4 is a view illustrating a conventional fuel cell structure.

As shown in FIG. 3, two kinds of the rubber powders 3 and 4, namely, the rubber of Shore A 25~50 (HS) and elastomer of Shore A 60~80 (HS) or plastic of Shore D 30~60 (HS) is ground into low hardness powders each having a diameter of 0.15~0.3 mm using a grinder (not shown), and other rubber or plastic is ground into powers each having a diameter of 0.1~0.15 mm, and the resultant powders are mixed together with the liquid rubber 5 using a mixer 20.

The thusly mixed rubber powders 3 and 4 and the liquid rubber 5 are sprayed to the rigid plate 2 moved along a conveyor using a spray gun 22 of the spray apparatus 21, and the resultant structure is vulcanized in the oven 23 and is cut into a certain size for thereby finishing a fabrication process of the gasket 6. Of course, any appropriate coating process can be used.

Namely, in the present invention, it is possible to continuously fabricate the gasket 6, resulting in a decrease in fabrication time compared to the conventional fabrication method in which a compression formation is used. The productivity is enhanced in the present invention.

The spray gun 22 of the spray apparatus 21 has a diameter of 0.4~0.5 mm.

The speed of the fabrication line is preferably 8~15 m/min, and a vulcanizing zone of UHF (Ultra High Frequency) is formed in the oven 23, so that it is possible to adjust the speed of vulcanization based on the speed of the fabrication line.

The dimension of the UHF vulcanization zone is preferably L=3~5 m, H=30~60 cm, and W=20~50 cm.

The following is a result of experiment conducted in the present invention. The result of the experiment of the present invention is not limited.

| Experimental result | | |
|---|---|---|
| | Conventional gasket | Present invention |
| Hardness (HS) | Shore A 55~60 | Shore A 25~50 |
| | | Shore A 60~80 |
| | | Shore D 30~60 |
| Min possible thickness | 0.8 mm | 0.3 mm |
| Permanent transformation possibility | 25% | Below 15% |
| Engaging force | 5000 kgf/cm$^2$ | 1000 kgf/cm$^2$ |
| Cell interval deviation | +−0.1 mm | +−0.001 mm |
| Productivity | Low | High |
| Durability | Low | High |
| Stack engaging workability | Low | High |

As shown in the above result of experiment, in the gasket for a fuel cell according to the present invention, it is possible to enhance productivity, durability, and workability compared to a gasket fabricated in the conventional fabrication method using a compression formation.

In particular, in the present invention, the deviation between cells is significantly decreased for thereby implementing a reliable performance in each cell.

As described above, the present invention relates to a gasket for a fuel cell implemented by a technique that at least more than two rubber powders having different hardness are sprayed to a rigid plate together with a liquid rubber based on a spray coating method and has the following advantages.

1) Since the intervals between cells are constantly maintained, and a performance deviation does not occur, it is possible to implement a reliable performance in each fuel cell.

2) Since it is possible to decrease the engaging force, the engaging mechanism may be light, thin, short and small.

3) Since the hardness is easily adjusted, a design application of elements is wide.

4) A soft material is transformed and spread in a shape like a film during a stack compression engagement, so that it is possible to decrease a flatness requirement of surface of a separator and other compression elements.

5) As a waste tire and non-metallic materials are adapted in the present invention, it is possible to recycle the industrial wastes. Adapting various kinds of materials decreases the product fabrication cost.

6) As a continuous fabrication process is implemented in the present invention, productivity is excellent, and there is no deviation in the products.

7) Since the rigid plate maintains an inherent shape of gasket, workability is excellent during a stack engagement.

8) It is possible to implement a uniform interval between cells irrespective of time of use as the rigid plate plays a role of spacer, resulting in an excellent durability.

Even though the present invention is described in detail with reference to the above embodiment, it is not intended to limit the scope of the present invention. It is evident from the foregoing that many variations and modifications may be made by a person having an ordinary skill in the present art without departing from the essential concept of the present invention.

What is claimed is:

1. A method for fabricating a gasket for fuel cells, comprising the steps of:
    grinding two kinds of rubbers having different hardness into a first and a second rubber powders each having a certain average size;
    mixing the ground rubber powders with a liquid rubber;
    spraying the mixed liquid rubber onto a surface of a rigid plate moving through a container based on a spray method in order for the mixed liquid rubber to be coated on the surface of the rigid plate uniformly;
    vulcanizing the rigid plate on which the first rubber powder and the second rubber powder are coated; and
    cutting the rigid plate on which the vulcanized first and second rubber powder are coated;
    wherein said first rubber powder comprises a material having a hardness of Shore A 25~50 (HS) and a diameter of 0.15~0.3 mm, and said second rubber powder comprises a material having a hardness of Shore A 60~80 (HS) and a diameter of 0.1~0.15 mm.

2. The method according to claim 1, wherein said rigid plate is formed of a fabric group having fiber with a glass transition temperature (Tg) of 120° C.~150° C., and a melting temperature (Tm) of 200° C.~250° C., or a plastic film, or a metal plate, wherein said fabric group, plastic film or metal plate has a thickness of 0.2~0.3 mm.

3. The method according to claim 1, wherein said first rubber powder and said second rubber powder are mixed at a volume ratio of 6~7:4~3, respectively.

4. The method according to claim 1, wherein said liquid rubber has a viscosity of 1,000,000~3,000,000 cp and is coated on the rigid plate with a thickness of 0.05~0.1 mm.

5. The method according to claim 1, wherein said second rubber powder further comprises a plastic powder having a hardness of Shore D 30~60 (HS).

6. A method for fabricating a gasket for fuel cells, comprising the steps of:
    providing a first rubber powder having a first average size and hardness and a second rubber powder having a second average size and hardness, wherein the first powder has a hardness (Shore A) lower than the hardness of the second powder, and an average diameter greater than the average diameter of the second powder;
    mixing the ground rubber powders with a liquid rubber to form a mixed liquid rubber composition;
    providing a rigid substrate having a thickness between about 0.2 to about 0.3 mm;
    coating the mixed liquid rubber composition onto at least one surface of the rigid substrate; and
    vulcanizing the coated substrate.

7. The method according to claim 6, wherein said first rubber powder is formed of a material having a hardness of Shore A 25~50 (HS) and a diameter of about 0.15 to about 0.3 mm, and the second rubber powder is formed of a material having a hardness of Shore A 60~80 (HS) and a diameter of about 0.1 to about 0.15 mm.

8. The method according to claim 6, wherein said rigid substrate comprises a fabric having polymeric fiber with a glass transition temperature of about 120° C. to about 150° C. and a melting temperature of about 200° C. to about 250° C.

9. The method according to claim 6, wherein said rigid substrate comprises a plastic or a metal plate.

10. The method according to claim 6, wherein said first rubber powder and said second rubber powder are mixed at a bulk volume ratio of 6~7:4~3, respectively.

11. The method according to claim 6, wherein said liquid rubber has a viscosity of about 1,000,000 to about 3,000,000 cp, and wherein the mixed liquid rubber composition is coated on the rigid substrate with a thickness of about 0.05 to about 0.1 mm.

12. The method according to claim 6, wherein said second rubber powder is a plastic powder having a hardness of Shore D 30~60 (HS).

13. The method according to claim 6, wherein said first rubber powder is formed of a rubber material having a hardness of Shore A 25~50 (HS) and a diameter of about 0.15 to about 0.3 mm;
    wherein said second rubber powder is formed of a rubber material having a hardness of Shore A 60~80 (HS) and a diameter of about 0.1 to about 0.15 mm, or a plastic powder having a hardness of Shore D 30~60 (HS), or a mixture thereof, wherein the hardness of the second powder is greater than the hardness of the first powder;
    wherein said liquid rubber has a viscosity of about 1,000,000 to about 3,000,000 cp, and wherein the mixed liquid rubber composition is coated on the rigid substrate with a thickness of about 0.05 to about 0.1 mm; and
    wherein said rigid substrate comprises a polymer with a glass transition temperature of about 120° C. to about 150° C. and a melting temperature of about 200° C. to about 250° C., or a metal.

14. A gasket for fuel cell, wherein said gasket is formed by the method of claim 6.

15. A gasket for fuel cell, wherein said gasket is formed by the method of claim 13.

* * * * *